United States Patent [19]

Zaim

[11] Patent Number: 5,367,797

[45] Date of Patent: Nov. 29, 1994

[54] PROCESS FOR TESTING A VESSEL

[75] Inventor: Adil Z. Zaim, San Francisco, Calif.

[73] Assignee: Omega Environmental, Inc., San Francisco, Calif.

[21] Appl. No.: 140,957

[22] Filed: Oct. 25, 1993

[51] Int. Cl.⁵ .................... G01M 3/26; G01M 3/00

[52] U.S. Cl. ........................... 73/49.2; 73/40; 73/37

[58] Field of Search ............... 73/37, 49.2 R, 40, 45.4

[56] References Cited

U.S. PATENT DOCUMENTS

| | | | |
|---|---|---|---|
| 3,800,586 | 3/1974 | Delatorre et al. | 73/49.2 |
| 4,670,847 | 6/1987 | Furuse | 73/49.2 |
| 4,811,252 | 3/1989 | Furuse | 73/49.2 |
| 4,899,573 | 2/1990 | Dimmick et al. | 73/49.2 |
| 4,947,352 | 8/1990 | Jenkins | 73/49.2 |
| 4,993,256 | 2/1991 | Fukuda | 73/49.2 |
| 5,078,006 | 1/1992 | Maresca, Jr. et al. | 73/40 |

FOREIGN PATENT DOCUMENTS

| | | | |
|---|---|---|---|
| 978221 | 4/1951 | France . | |
| 54-99686 | 7/1979 | Japan . | |
| 4132926 | 5/1992 | Japan | 73/49.2 |
| 8101333 | 5/1981 | WIPO | 73/49.2 |

Primary Examiner—Thomas P. Noland
Assistant Examiner—John David Wiggins
Attorney, Agent, or Firm—Glen R. Grunewald

[57] ABSTRACT

Establishing that pressure-influencing factors other than leakage of gas have stabilized before testing the integrity of a vessel in a system including the vessel, a reference vessel that can be connected to and isolated from the vessel, a common source of pressurized gas, a gauge to measure the difference between the vessel pressure and the reference vessel pressure and a computer capable of recording a series of pressure-difference measurements and mathematically manipulating them, the method including equalizing the pressures in the two vessels, then isolating them from each other for a preselected time period, then recording the pressure difference between them at the end of the time period, again equalizing the pressures and repeating that sequence until the pressure difference at the end of two consecutive time intervals is the same, thereby establishing that pressure-influencing factors other than leakage have stabilized.

2 Claims, 2 Drawing Sheets

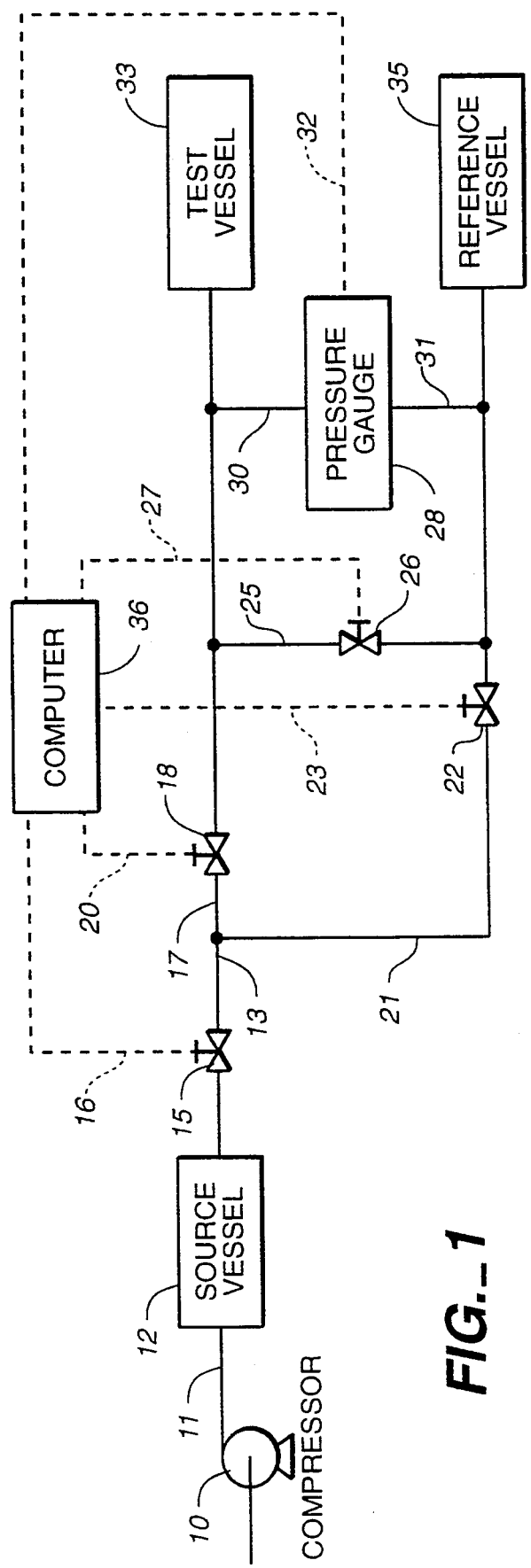
FIG._1

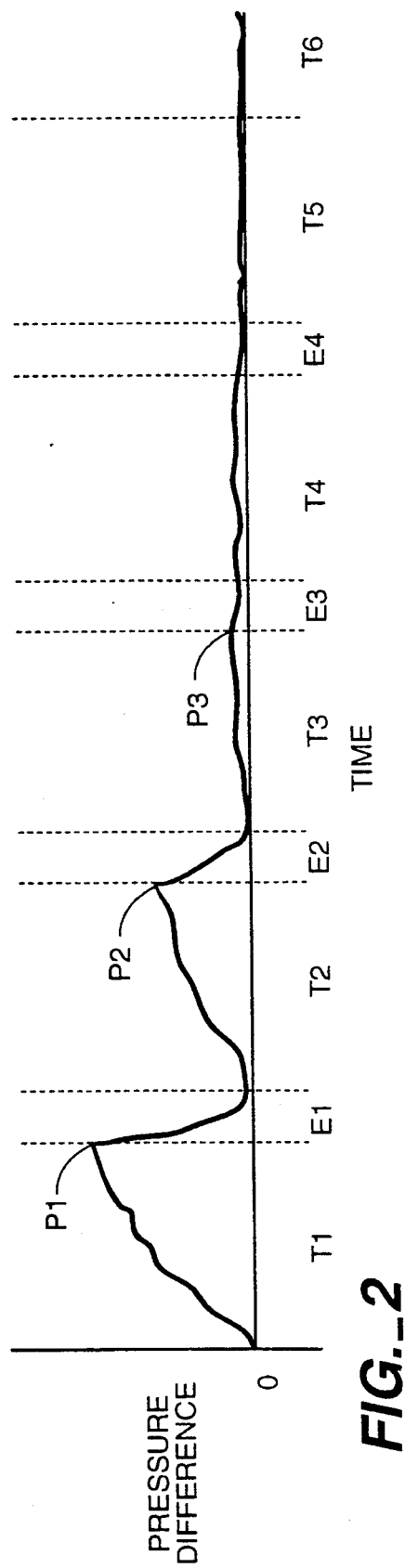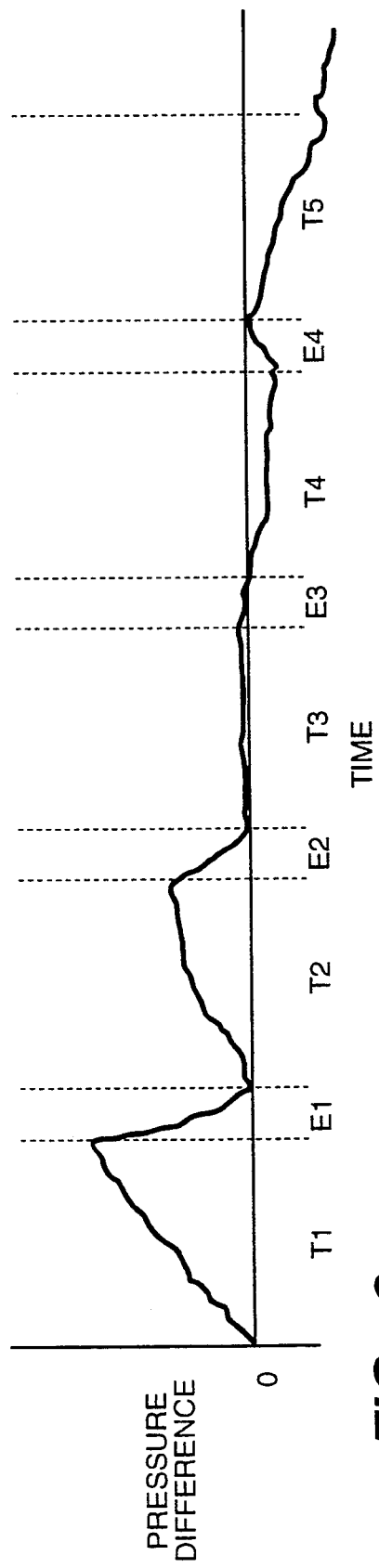

PROCESS FOR TESTING A VESSEL

FIELD OF THE INVENTION

This invention is in the field of testing a vessel to determine whether it leaks.

BACKGROUND ART

Vessels for holding liquids and pressure vessels are usually tested to determine their integrity before they are put into use. Leakage of fluid from a vessel can be due to many causes—for example, welds, fittings or valves may leak and, when higher pressures are used to store gases such as hydrogen or helium, even a porous weld or a porous metal plate can be a source of leakage. Integrity testing is normally accomplished by putting gas at elevated pressure into a vessel fitted with a pressure gauge. The pressure of the gas used to test the vessel is at or above the pressure expected to be the operating pressure of the vessel. The vessel being tested, hereinafter the test vessel, is pressurized to the test pressure after which all valves are closed and the pressurized vessel is permitted to stand for an appropriate time period. The pressure indicated by the pressure gauge is noted and recorded, and loss of pressure over time is an indication that the vessel leaks. This method of testing a vessel has many drawbacks because, particularly at high test pressures, small losses of pressure are hard to discern on a gauge that is capable of indicating the test pressure.

It is known to test the integrity of a vessel by measuring the difference in pressure between the test vessel and a reference vessel which usually has a much smaller volume and is constructed to have virtually no leakage. The integrity of the test vessel is tested by pressurizing both the test vessel and the reference vessel with exactly the same gas pressure, usually from a common source of gas, and then isolating the test vessel from the reference vessel and isolating both vessels from the common source of gas. In such a system leakage is found by the pressure difference between the two vessels after they have stood for a sufficient time period. With this method of testing, leakage is indicated by small pressure differences even though the absolute pressure in both vessels may be very large; therefore it is a much more sensitive test than just measuring gross pressure-loss. French patent No. 978,221 issued to Sterrett discloses such a process and apparatus.

However, pressure differences occur for reasons other than leakage of gas from a test vessel. In almost all pressure tests the pressurized gas in the test vessel is initially at a different temperature than the ambient temperature. When test gas is introduced into the test vessel from a high pressure source such as a gas bottle, the expansion of gas causes it to cool to a temperature lower than ambient temperature. When gas is introduced into the test vessel directly from a compressor, it is hotter than ambient because of the heat caused by compressing it. Usually the test vessel is much larger in volume than the reference vessel so that initial gas temperatures in the two vessels will be different. In addition, factors such as oxidation of the vessel walls, expansion of vessel walls or adsorption of gas (generally called seasoning of the vessel) can cause pressure changes within a test vessel due to factors other than leakage. As a result, in almost every pressure test using a test vessel and a reference vessel, either the test must be carried on for a long enough time period for pressure-influencing factors other than leakage to stabilize, or a subjective judgment must be made that observed pressure-differences between the vessels are caused by factors other than leakage.

SUMMARY OF THE INVENTION

The process of this invention is carried out with apparatus including a test vessel, a reference vessel, a common compressed-gas source, means to measure the pressure difference between the test vessel and the reference vessel, a valve that can isolate both vessels from the common gas source, and valves that can isolate the test vessel and the reference vessel from each other. In a preferred embodiment the apparatus employed for testing the test vessel includes a computer that can receive and store signals representative of pressures. Said computer has a clock means, means for signaling opening and closing of valves, and means for mathematically manipulating the data that are representative of pressure differences.

The process of this invention indicates when pressure changes caused by temperature stabilization and seasoning are complete so that a reliable pressure test can be started. The process of this invention is started by opening the valves that permit pressurized gas to flow from the common source to pressurize both the test vessel and the reference vessel and to permit gas to flow between vessels to provide identical gas pressure in both vessels; after which the valves are closed, isolating both vessels from the gas source and from each other. At the instant the valves that isolate both vessels from the gas source and the test vessel and the reference vessel from each other are closed, the test vessel and the reference vessel are at the same pressure so the pressure differential gauge reads zero; and at that time a first preselected time interval begins. In the process of this invention valves isolating both vessels from each other remain closed for that preselected time interval (for example, five minutes); after which the pressure difference between the vessels is read and recorded either by an operator or by a computer. The valve connecting the test vessel and the reference vessel is opened for a very brief time period, long enough for the pressures in the two vessels to equalize, and then the valve is closed to isolate the vessels from each other again.

In almost every pressure test a pressure difference between the test vessel and the reference vessel is noted at the end of the first time interval. The pressure difference at the and of the first time interval may be caused by gas leakage, by the change of temperature of the gas within one or both vessels caused by coming to temperature equilibrium with their surroundings, or by seasoning the test vessel. Even in those rare cases where there is no change in pressure difference between vessels after the first time interval, that lack of change cannot be used to indicate that the test vessel is sound because of the possibility that pressure increases in the test vessel due to increasing the temperature of the test gas are exactly offset by pressure decreases due to leakage.

The next step in the process of this invention is to open the valve between the vessels and equalize the pressures in the test vessel and the reference vessel again, then to isolate the vessels from one another again and to start a second time interval. The second time interval typically, but not necessarily, is the same as the first time interval. At the end of the second time interval the difference in pressure between the test vessel and the reference vessel is again noted, and the pressure difference between the vessels is again equalized. The procedure of equalizing pressures, starting new time intervals, noting pressure differences at the end of the time intervals is repeated for as long as necessary until the data obtained from the procedure confirms that the conditions in the test vessel have stabilized and a pressure test can begin, or alternatively that a leak exists that prevents conditions in the test vessel from stabilizing.

Data that confirms that conditions in the test vessel have stabilized are a zero pressure difference between the vessels at the close of two consecutive time intervals. Normally four or five time-interval and pressure-equalization steps are required to confirm stabilized conditions. The time intervals are normally four or five minutes so that the pressure-stabilization test usually can be accomplished quickly. The number of time-interval and pressure-equalization steps needed will depend to a large extent on conditions when the test begins. For example, a worst case would be a large-volume test vessel to be tested indoors in a warm room using a test gas stored outdoors on a very cold day. In such a case, stabilizing temperature-influenced pressure changes of a large volume of cold gas may take many pressure-equalizing and time-interval stages. But under similar conditions, the prior methods of testing (for example, the method disclosed in the Sterrett patent cited above) would also take correspondingly longer, and the end point of the temperature stabilization period would be at least as difficult to determine as if the test started with gas temperatures near room temperature. The very act of delivering test gas to a test vessel and a reference vessel creates gas temperatures different from ambient, and the advantage of the process of this invention is that the end of the stabilization period and the time at which an actual pressure test can begin is quickly and unambiguously identified.

BRIEF DESCRIPTION OF THE DRAWINGS

FIG. 1 is a schematic diagram of a device useful to perform the process of this invention.

FIG. 2 is a typical pressure difference versus time curve for the process of this invention indicating the stabilization end point and further indicating that the test vessel is sound.

FIG. 3 is a typical pressure difference versus time curve for a vessel that has unacceptable leakage.

DETAILED DESCRIPTION OF THE INVENTION

Apparatus suitable for conducting the process of this invention is illustrated in FIG. 1. The apparatus includes a compressor 10 connected by line 11 to a holding vessel 12 indicated as a source vessel for compressed gas. The source vessel 12 is connected through conduit 13 to valve 15, and valve 15 is connected through control line 16 to computer 36. Valve 13 branches into conduits 17 and 21—conduit 17 containing a valve 18 connected through control line 20 to computer 36 and conduit 21 containing valve 22 connected through control line 23 to computer 36. A conduit 25 including a valve 26 connects conduit 17 and 21, and valve 26 is connected through control line 27 to computer 36. Conduits 30 and 31 connect pressure gauge 28 between conduit 17 and 21 so that pressure gauge 28 will read any pressure difference between those conduits and therefore pressure differences between test vessel 33 and reference vessel 35 which are in open communication with conduits 30 and 31. Test vessel 33 is a vessel whose integrity is being testing in accordance with the process of this invention, and reference vessel 35 is desirably a vessel of confirmed integrity, preferably substantially smaller than test vessel 33 and fitted with piping and valves, if any, that are substantially free of leaks.

In the process of this invention, compressor 10 provides source 12 with a sufficient amount of gas at a pressure that is adequate for testing the vessel 33. If the vessel 33 is to hold liquid at atmospheric pressure, the test pressure need be only enough higher than atmospheric to determine whether there are leak sites in the vessel 33 or its peripheral equipment that are unacceptable for its use as a holding vessel for, for example, petroleum. If test vessel 33 is a pressure vessel designed to hold gas at elevated pressures, then the source 12 will provide compressed gas at a pressure sufficiently higher than the use pressure of use vessel 33 to determine whether it has unacceptable leaks. When source 12 is a gas bottle, compressor 10 and line 11 may be unnecessary.

In the embodiment of FIG. 1 a computer is employed not only to operate the different elements of the apparatus but also to mathematically manipulate data generated during the process of this invention, which data determines the integrity of vessel 33.

The test is begun by computer 36 operating through control lines 16, 20, 23 and 27 opening all of valves 15, 18, 22 and 26. With all valves open gas flows from source 12 into test vessel 33 and reference vessel 35. When the vessels are at a useful test pressure, valves 15, 18 and 22 are closed by the operation of computer 36 but valve 26 remains open so that there is open communication between test vessel 33 and reference vessel 35. Valve 26 remains open until pressure gauge 28 reads zero, indicating that both the test vessel 33 and the reference vessel 35 are at identical pressures. At that point valve 26 is closed and the testing procedure begins.

FIG. 2 illustrates a typical testing procedure for a test vessel that is found to be sound. FIG. 2 illustrates graphically the test procedure on a plot of pressure difference versus time. The pressure differences are on the vertical scale and time is on the horizontal scale which is broken into time intervals identified as T1, T2, T3, T4, T5 and T6. Each of the time intervals is separated by an equalization time interval identified as E1, E2, E3, and E4. Normally each time interval is of about five minutes duration or less, and each equalization interval is very brief—long enough to equalize the pressures in the vessels (usually about 30 seconds or less). The intervals may be longer or shorter depending on the characteristics of each test.

As illustrated in FIG. 2, time interval T1 begins when valve 26 is closed so that test vessel 33 and reference vessel 35 are completely isolated both from each other and from source 12. In the plot of FIG. 2 a pressure difference between the vessels develops and reaches the point P1 at the end of interval T1. The pressure difference P1 is of unknown origin at this point in the process—being due to any one or more of the gas temperature coming to equilibrium with the ambient temperature, gas disappearing due to seasoning of the test vessel, or gas leaking from the test vessel. FIG. 2 illustrates that the curve of differential pressure versus time is not a smooth curve but rather an irregular curve for which the slope at any particular point is difficult to identify.

Under any circumstances, at the end of interval T1 the gas-differential pressure is recorded, valve 26 is opened and vessels 33 and 35 are directly connected to each other for time E1; and as a result the pressure differential between them drops to zero. Time interval T2 is then begun by closing valve 26, again isolating vessels 33 and 35 from each other; and again a pressure differential between the vessels develops reaching pressure difference P2 at the end of time interval T2. At the end of time interval T2 the pressure P2 is recorded, valve 26 is again opened for the time period E2, and again the differential pressure between vessels 33 and 35 drops to zero. Repeating the procedure, at the end of interval E2 valve 26 is closed again to start time interval T3; and once again a pressure differential between the vessels develops and is recorded at the end of interval T3; and valve 26 is again opened for interval E3; and the pressures between the vessels are again equalized; and again the valve 26 is closed at the end of interval E3 to start interval T4.

The pressure difference at the end of time interval T4 is only slightly higher than the zero, which is close to being the same as it was at the beginning of time interval T4, which suggests that at some point during the time interval T4 the factors causing pressure differences between the test vessel and the pressure vessel stabilized. At the end of time interval T4 valve 26 is again opened for a sufficient time for the pressure difference between the vessels to become zero and time interval T5 is begun by closing the valve 26. The pressure differential at the end of time interval T5 is substantially zero so that the data from interval T5 confirms that conditions stabilized during interval T4. As a result, the beginning of interval T5 can be used as the beginning of a test period, shown as T6, of any duration to determine the integrity of the test vessel 33. Thus, if the proposed use of test vessel requires it to contain the test gas at the pressure within test vessel 33 for a period of 12 hours, the beginning of interval T5 can reliably be used as the beginning of the 12-hour test period T6 because at that time it is known that all pressure differential-causing conditions other than leakage have been stabilized and the ongoing pressure test will measure only pressure differentials caused by loss of gas from test vessel 33 due to leakage. The beginning of test interval T5 is a reliable time to start looking for slow leaks that cause discernable pressure loss from vessel 33 over the prolonged test period T6.

The analysis of FIG. 2 is that unstable conditions within test vessel 33 probably stabilized sometime during time interval T3 because, even though a pressure differential P3 was noted at the end of time interval T3, it was not a significant pressure differential. This conclusion (that conditions stabilized during T3) is confirmed by the substantially flat plot of time versus pressure difference in time intervals T4 and T5, so that the long-time pressure test T6 can start at the beginning of time interval T5 with assurance that pressure-influencing factors other than leakage have stabilized.

FIG. 3 illustrates the process of this invention used to test a leaky test vessel 33. FIG. 3 is also a plot of pressure difference versus time using the same time intervals and equalization intervals that were used in the testing procedure graphically illustrated in FIG. 2. Again, the test is begun with the pressures in vessels 33 and 35 being equal. Again, consistent with the method of this invention, the pressure difference is noted at the end of interval T1, pressures in the vessels are equalized in interval E1, after which valve 26 is closed, and again a pressure differential develops between the two vessels. At the end of interval T2 the pressure differential is again recorded and equalized during interval E2; and again when the differential is zero, the valve 26 is closed to begin time interval T3. In the particular test noted in FIG. 3, the pressure at the end of interval T3 is substantially the same as the pressure at its beginning which suggests that the conditions within the vessels have stabilized. However, an equalization period E3 is begun by opening the valve 26 until a zero differential is noted and then closing it again for a confirming time interval T4. At the end of time interval T4 there is a negative pressure differential between the vessels which indicates that there is leakage from the test vessel 33. The pressure equalization E4 however is conducted by opening valve 26 until the pressure differential becomes zero. Valve 26 is then closed and time interval T5 is begun which, as is indicated in FIG. 3, shows a continuing pressure differential developing between the vessels and thereby does not confirm that conditions have stabilized but rather suggests leakage from test vessel 33. A pressure test with both vessels isolated from each other therefore can be considered started at the beginning of interval T5 and conducted for as long as necessary to determine whether the leakage indicated by the process of this invention is at an unacceptable level.

In the preferred embodiment of the invention the computer 36 not only signals the various elements of the apparatus times for operation (such as opening and closing of the valves) but additionally collects and stores data concerning pressure differentials and times the various portions of the process. Although FIGS. 2 and 3 show graphical representations of the process, the computer 36 can manipulate the data mathematically and provide results in tabular form—or simply as acceptable or unacceptable end points of the stabilization procedure.

The process of this invention essentially eliminates the ambiguity in pressure testing caused by stabilization of pressure-influencing factors other than gas leakage. If the test was conducted without the alternate time intervals and equalization intervals, the pressure test of a sound vessel would be graphically represented by a rising curve that tended to level off at some positive pressure differential. The curve would not have a distinct end point showing stabilization of those pressure-influencing factors other than leakage. Thus, the beginning of a test period with all such factors stabilized would have to be delayed for a time interval that would give the testing operator a reliable indication of the point where the only factor influencing the pressure differential between the test vessel and the reference vessel is leakage. The process of this invention provides a very sensitive identification of the stabilization end point by frequently and repeatedly relating the stabilization data to a zero base line rather than discerning it based on the rate of change of the slope of a curve that is characteristically not a smooth curve.

FIGS. 2 and 3 represent a testing process in which the test-gas temperature in the test vessel is initially colder than ambient and thereby causes an increase in gas pressure as it warms. In those cases where the gas in the test vessel is initially warmer than ambient, a similar plot of time versus pressure will be obtained, but the pressure differential will be negative.

I claim:

1. A process for establishing the stability of factors influencing pressure in a process for testing the integrity of a vessel employing a system including said vessel, a reference vessel, a fluid passageway including a valve between said vessel and said reference vessel, means to supply gas at a test pressure to both said vessel and said reference vessel from a common source, and means to measure the difference between the gas pressure in said vessel and said reference vessel said process comprising:

introducing gas into said vessel and said reference vessel at the same pressure from said common gas source with said valve open until the difference in pressure between said vessel and said reference vessel is zero, isolating said vessel and said reference vessel from said gas source, closing said valve, recording the value of the difference in pressure between said pressure vessel and said reference vessel after passage of a preselected time interval, opening said valve at the end of said preselected time interval for a time sufficient to equalize the pressures in said vessel and said reference vessel and then closing said valve, recording the value of the difference in pressure between said vessel and said reference vessel after the passage of another preselected time interval, repeating the steps of opening said valve to equalize pressures and closing said valve for further preselected time intervals and recording the value of the pressure difference until the pressure difference between said vessels, at the end of two consecutive time intervals is substantially zero, whereby pressure changing factors other than leakage are established as stabilized, and closing said valve for a time period sufficient to establish the integrity of said vessel as indicated by changing pressure difference indicated by said means to measure pressure difference.

2. The process of claim 1 wherein said system includes a computer having means to receive and store signals representative of the difference in pressure in said vessel and said reference vessel, having means to actuate said valves to open and close, having clock means and having means to mathematically manipulate data representative of pressure difference values, said computer measuring each time interval, recording pressure difference values at the end of each preselected time interval, opening said valve at the end of each preselected time interval, closing said valve at the start of each preselected time interval and identifying the end of a second consecutive time interval at which said pressure difference is substantially zero.

* * * * *